United States Patent [19]
Shou et al.

[11] Patent Number: 5,848,096
[45] Date of Patent: Dec. 8, 1998

[54] COMMUNICATION METHOD AND SYSTEM USING DIFFERENT SPREADING CODES

[75] Inventors: Guoliang Shou; Changming Zhou; Makoto Yamamoto, all of Tokyo; Mamoru Sawahashi; Fumiyuki Adachi, both of Kanagawa; Sunao Takatori, Tokyo, all of Japan

[73] Assignees: NTT Mobile Communications Network, Inc.; Yozan Inc., both of Tokyo, Japan

[21] Appl. No.: 708,987

[22] Filed: Sep. 6, 1996

[30] Foreign Application Priority Data

Sep. 8, 1995 [JP] Japan .................................. 7-255752

[51] Int. Cl.⁶ .................................................. H04K 1/02
[52] U.S. Cl. .............................................. 375/207; 375/343
[58] Field of Search ..................................... 375/200, 350, 375/207, 206, 208, 342, 343; 370/342, 335, 479, 208, 209, 203; 359/561; 380/34, 48, 46, 44

[56] References Cited

U.S. PATENT DOCUMENTS

| | | | |
|---|---|---|---|
| 4,253,067 | 2/1981 | Caples et al. | 329/110 |
| 4,630,283 | 12/1986 | Schiff | 375/1 |
| 5,343,496 | 8/1994 | Honig et al. | 375/207 |
| 5,661,757 | 8/1997 | Takahashi et al. | 375/281 |

OTHER PUBLICATIONS

Tachika et al., A Development Conditions and Its Technical Issue of Digital Matched Filters in Spread–Spectrum Communication Systems, Technical Report of IEICE, SST92–21, 1992.

Tanaka et al., Development of Low Power Consumption LSI for SS Communication, Technical Report of IEICE, SST95–77, Oct. 1995.

Ogawa et al., Development of 1 Chip SS Communication LSI Using Digital Matched Filters, Technical Report of IEICE, ISEC94–65, Dec. 1994.

Dual 64–TAP, 11 Mcps Digital Matched Filter/Correlator STEL–3310, Stanford Communications, 1990.

*Primary Examiner*—Chi H. Pham
*Assistant Examiner*—William Luther
*Attorney, Agent, or Firm*—Pillsbury Madison & Sutro LLP

[57] ABSTRACT

A communication method and system which can enlarge the communication capacity using a rather simple system. The communication method and system provides different spreading codes to two signal systems at a receiving station.

3 Claims, 3 Drawing Sheets

COMMUNICATION METHOD AND SYSTEM USING DIFFERENT SPREADING CODES

BACKGROUND OF THE INVENTION

1. Field of the Invention

The present invention relates to a spread spectrum communication method and system therefor, in which a digital signal to be transmitted is divided into two bit strings each corresponding to alternate bits of the digital signal. In particular, an analog signal is composed by multiplying the bit strings by spreading code sequences specific to a receiving station. The composed signal is transmitted and received by the receiving station, and the signal received by the receiving station is judged whether the signal is oriented to the receiving station or not by multiplying the received signal by the spreading code sequences.

2. Description of the Related Art

A spread spectrum communication method has a number of benefits such as high efficiency of the frequency, secrecy, etc., and is promising in the field of the communication of moving objects and radio LAN.

A theoretical discussion of modulation and demodulation of a spread spectrum communication follows. On the transmitting side, assuming I and Q components of information data sequence to be $I_i$ and $I_q$, and the components of I and Q of spreading codes to be $C_i$ and $C_q$, I and Q components $S_i$ and $S_q$ of spreading modulating signal are defined by formulas (1) and (2).

$$S_i = I_i C_i - I_q C_q \quad (1)$$

$$S_q = I_i C_q + I_q C_i \quad (2)$$

On the other hand, on the receiving side, assuming the I and Q component of received and modulated signal to be $R_i$ and $R_q$, I and Q components $D_i$ and $D_q$ of the signal after despreading are expressed by formulas (3) and (4).

$$D_i = R_i C_i + R_q C_q \quad (3)$$

$$D_q = -R_i C_q + R_q C_i \quad (4)$$

FIG. 6 shows a part of the structure of a receiving system using a matched filter in such a conventional communication. A received analog signal Ain6 (intermediate frequency IF signal) is distributed to two systems by a distributor D, and quadrant detection is performed by multipliers (shown by X) so that components Q and I of the analog signal are extracted. The noise of these components are reduced through low-pass filters LPF, then, the component Q is input to matched filters MF1 and MF2, and the component I is input to MF3 and MF4, respectively. A spreading code PNQ for the component Q is provided to matched filters MF1 and MF3 from a code generator, and a spreading code PNI for the component I is provided to matched filters MF2 and MF4. The matched filters multiply respective spreading code to each signal component and calculate the total sum of the multiplication result.

In a receiving system using a conventional sliding correlator in FIG. 7, similar to the structure in FIG. 6, received signal Ain7 (intermediate frequency IF signal) is converted into the components Q and I by the quadrant detector and low-pass filter. Then, the spreading codes of the components Q and I are multiplied by the component Q, and the spreading codes of the components Q and I are multiplied by the component I. PNI and PNQ generate the spreading codes. Then, the components Q and I extracted by the spreading code are composed. The time tracking by a DLL (Delay Locked Loop: not shown) is performed for the composed signal and detected peak is traced by controlling the spreading code generator.

In this way, the communication speed increases, or the reliability such as error ratio is enhanced and the capacity of communication is improved as the number of systems increases. However, the communication system is complicated, and apparatus cost and electrical power consumption are increased.

SUMMARY OF THE INVENTION

The present invention solves the above problems of the conventional devices and has an object to provide a communication method and system which can enlarge the communication capacity by using rather simple systems.

A communication method and system according to the present invention provides different spreading codes from each other to two signal systems at a receiving station. Despreading of the two systems is performed by two spreading code signals in a pair of multipliers which are connected to each sampling and holding circuit.

The correction error coding is easier on a receiving side and the accuracy of the communication is improved. Also, the size of a circuit is only a little larger because there is only one circuit for holding signals on a receiving station.

PREFERRED EMBODIMENT OF THE PRESENT INVENTION

Hereinafter, the first embodiment of a communication method and system are described with reference to attached drawings.

Figure 1:
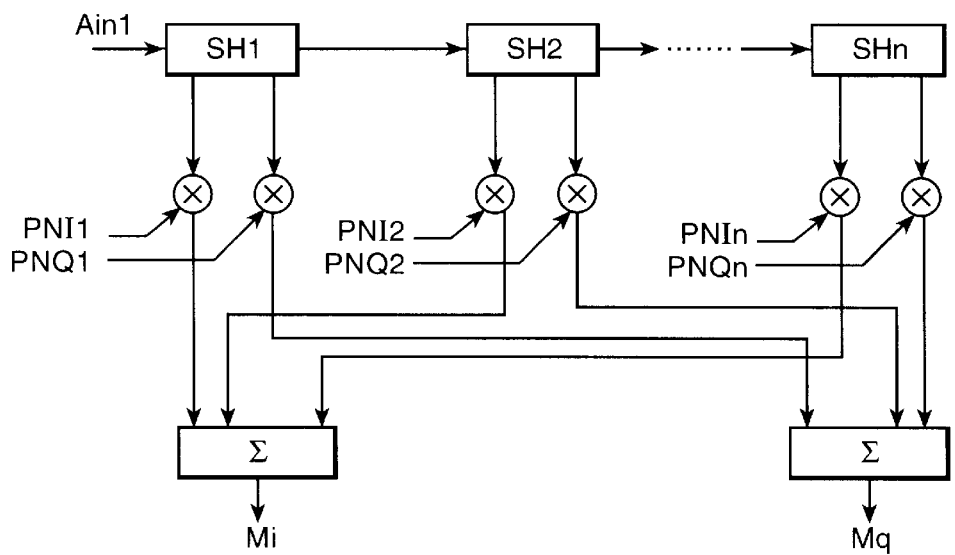
FIG. 1 shows the first embodiment of a matched filter circuit for a communication method according to the present invention.

FIG. 1 shows a matched filter circuit of the receiving station of the communication system in accordance with the first embodiment. The matched filter circuit MF includes sampling and holding circuits SH1 to SHn corresponding to the number of the spreading ratio (n in the FIG. 1). A received signal Ain1 is transmitted successively from sampling and holding circuit at the first stage to the following stages.

During transmission, the signal held in each sampling and holding circuit is input to a pair of multipliers (shown by X) and is multiplied by each spreading code of components Q and I. That is, the signal held in i-th sampling and holding circuit SHi is multiplied by PNQi and PNIi of the spreading codes for the components Q and I. The result of the multiplication is accumulated by an accumulator (Σ in the FIG. 1) with respect to the components Q and the component I, independently. The result of the accumulation is shown by Mi and Mq in FIG. 1.

PNQ and PNI are set as codes of quasi-quadrant data with weak correlation. Even when the quality of the signal is poor, it is possible to judge whether the signal is addressed to the station or not, which receives the signal, by one of the components (one signal system). Correction error coding is possible according to the judgment. The quasi-quadrature is the concept including correlation of "0" as the quadrature.

The communication method above is as reliable as the method occupying two channels in the conventional communication. As shown in FIG. 1, the number of sampling and holding circuits SH1 to SHn is the same as the receiver of one channel. The size of the circuit is almost the same as that of the conventional type having one channel.

Figure 2:
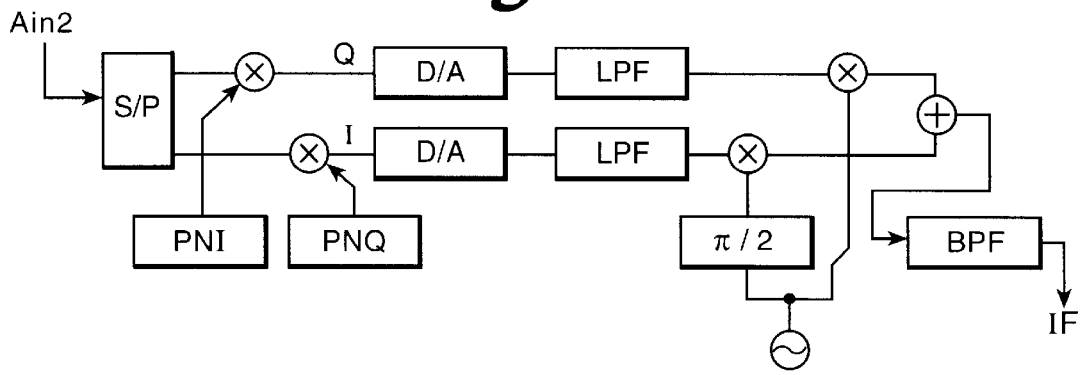
FIG. 2 shows a block diagram of the main part of a transmission system for the communication method in FIG. 1.

FIG. 2 shows a part of a transmitter for the communication system of the first embodiment. A digital signal Ain2 to be transmitted is converted into components of two systems having alternate signal bits by a serial and parallel converter S/P. Then, the signals output from the converter are multiplied by the spreading codes of the two components by spreading code generators PNI and PNQ in multipliers (shown by X).

The results of the multiplication are respectively converter into analog signals by D/A converters (shown by D/A in FIG.2). The noise of the analog signals are respectively reduced by low-pass filters. Then, a carrier frequency from an oscillator and signals of two systems are multiplied and added. The signal of Q component is shifted to be in advance of the component I by the phase of π/2 and the components of I and Q are composed. The noise of the composed signal is reduced by band-pass filter BPF. The transmitted signal is a composite signal of components I and Q multiplied by spreading codes. The same spreading codes are conventionally applied to both components I and Q. On the other hand, different spreading codes are applied in the present invention.

Figure 3:
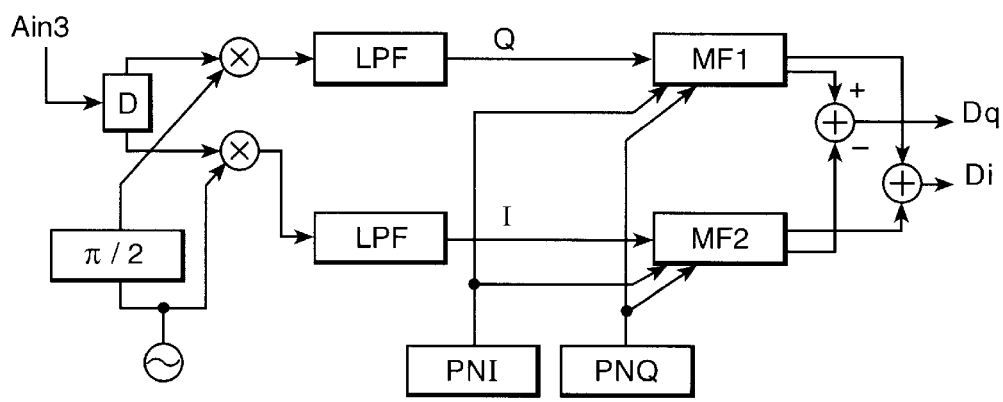
FIG. 3 shows a block diagram of the first embodiment of a receiving system using a matched filter according to the present invention.
Figure 4:
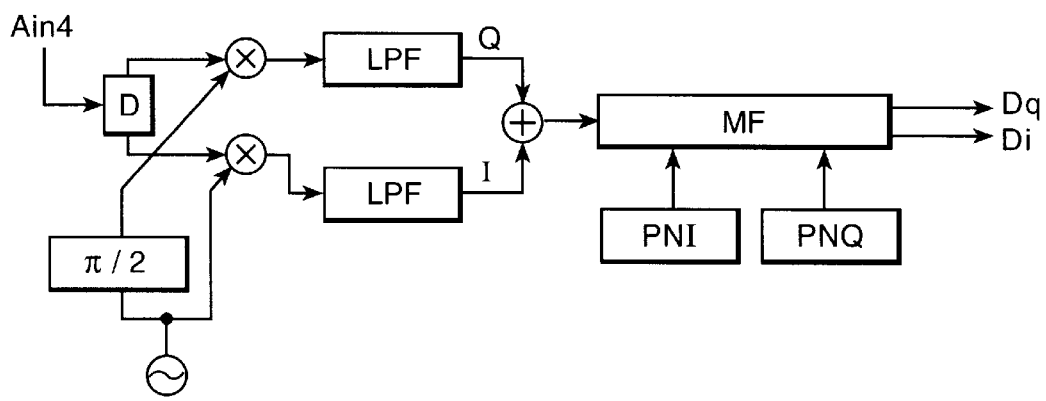
FIG. 4 shows a block diagram of the second embodiment of the receiving system using the matched filter in FIG. 3.

The receiving system using the matched filter in FIG. 1 is constructed as in FIG. 3 or FIG. 4.

In FIG. 3, a received signal Ain3 (an intermediate frequency IF signal) is divided into two signals by a divider D, and the components of I and Q are extracted through quadrant detection. The components Q and I are input to matched filters MF1 and MF2, respectively, through a low-pass filters LPF. The matched filter is constructed as in FIG. 1. A matched filter MF1 for the component Q extracts principal components by PNQ, as well as the component I mixed in the component Q extracted by PNI. The matched filter MF2 for the component I extracts principal components of signal CI by PNI, as well as the component Q mixed in the component extracted by PNQ. The method for the extraction utilizes the quasiquadrant characteristics of the codes of PNI and PNQ.

In FIG. 4, a received signal Ain4 (an intermediate frequency IF signal) is divided into two signals by a divider D, and the components of I and Q are extracted through the quadrant detector. The components are composed by an analog adder (shown by +) through low-pass filters LPF. The composed signal is input to a single matched filter MF, and the components of Q and I are extracted. The detection is performed in order that a high frequency component is easily divided from the received signal. By providing quadrature to the components I and Q by quadrants detection, the division thereof is easily accomplished. The reason why the components I and Q can be divided by the single matched filter is that the codes of PNI and PNQ are quasi-quadrant data and have a weak correlation.

Figure 5:
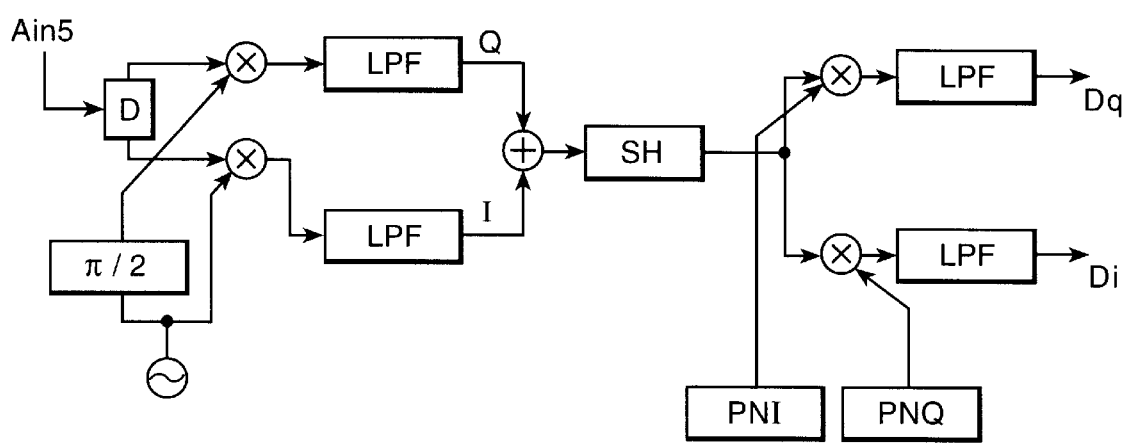
FIG. 5 shows a block diagram of the first embodiment of a sliding correlator according to the present invention.
Figure 6:
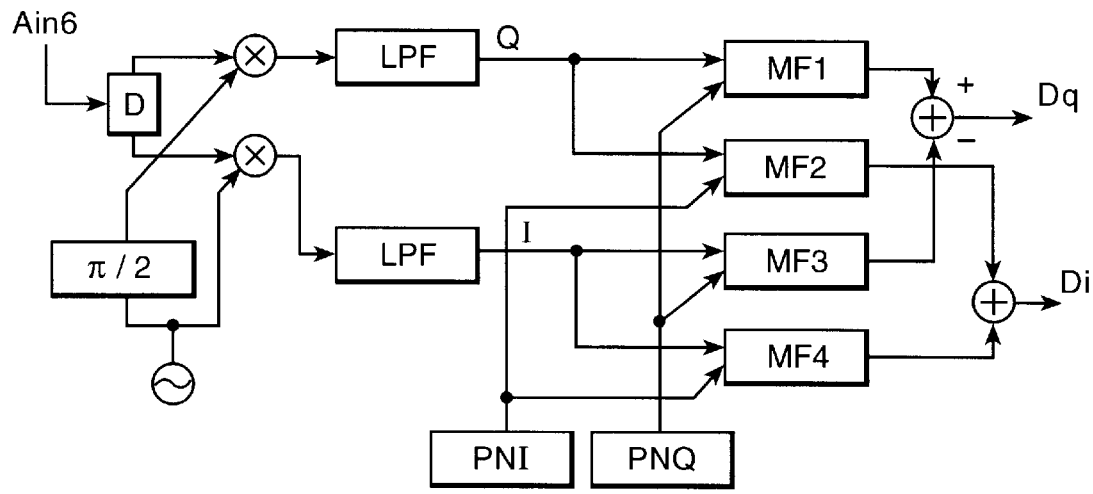
FIG. 6 shows a block diagram of a receiving system using a conventional matched filter.
Figure 7:
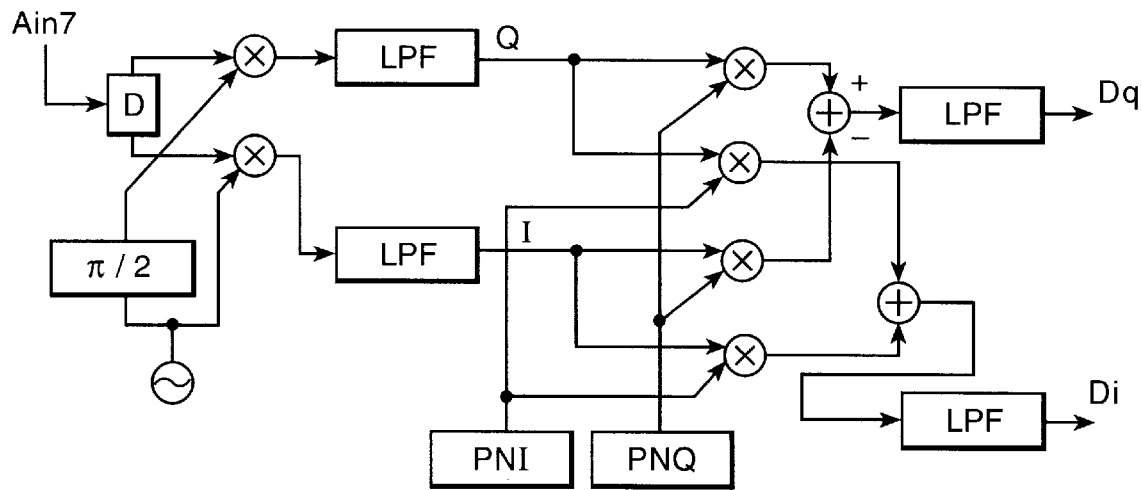
FIG. 7 shows a block diagram of a receiving system using a conventional sliding correlator.

FIG. 5 shows a block diagram of the first embodiment of a receiving system using a sliding correlator according to the present invention. In the receiving system, an adder (shown by +) is arranged so as to compose the divided components Q and I, at the next stage after stages of a conventional quadrant detection and a low-pass filtering. An output of the adder is input to the sampling and holding circuit SH which holds a plurality of signals for over-sampling for peak detection. A similar sampling and holding is performed in the multiplier in FIG. 7. In this embodiment, whole over-sampling can be realized by a single sampling and holding circuit because input signals are composed. An output of the sampling and holding circuit is input to two multipliers (shown by X) in parallel and the multiplication of each spreading code from PNQ and PNI is performed. Similar to the case of a matched filter, the spreading codes of Q system and I system are set independently. Therefore, it is easy to perform correction error coding and other processings with respect to the extraction of component Q and I. The circuit is simple because analog signals are composed.

A communication method and system according to the present invention provides different spreading codes to two signal systems at a receiving station. Therefore, the correction error coding is made easier on the receiving side and the accuracy of the communication is improved. Also, the size of a circuit is only a little larger than a conventional circuit because only one circuit for holding signal on a receiving station is needed.

What is claimed is:

1. A receiving system for a communication system in which a signal to be transmitted is spread by first and second pseudo-noise sequences, said sequences being different from each other, for in-phase (I) and quadrature (Q) components of said signal comprising:

i) a plurality of sampling and holding circuits for holding a received signal, each of said plurality of sampling and holding circuits being serially connected to each other;

ii) a plurality of first multiplication circuits, each of said plurality of first multiplication circuits being respectively connected to one of said plurality of sampling and holding circuits for multiplying said received signal by said first pseudo-noise sequence to respectively provide a plurality of first output signals;

iii) a first addition circuit for calculating a sum of said plurality of first output signals;

iv) a plurality of second multiplication circuits, each of said plurality of second multiplication circuits being respectively connected to one of said plurality of sampling and holding circuits which are commonly connected to one of said plurality of first multiplication circuits for multiplying said received signal by said second pseudo-noise sequence to respectively provide a plurality of second output signals; and v) a second addition circuit for calculating a sum of said second output signals;

wherein said I and Q components are despread by one of said plurality of sampling and holding circuits.

2. The receiving system of claim 1, wherein said plurality of sampling and holding circuits is formed by only a single set of sampling and holding circuits; and both one of said plurality of first multiplication circuits and one of said plurality of second multiplication circuits simultaneously multiply the same received signal sampled and held in one of said plurality of sampling and holding circuits by said first and second pseudo-noise sequences, respectively.

3. The receiving system of claim 1, wherein said first and second pseudo-noise sequences are formed by quasi-quadrant data with a weak correlation.

* * * * *